(12) United States Patent
Washio et al.

(10) Patent No.: US 7,848,780 B2
(45) Date of Patent: Dec. 7, 2010

(54) COMMUNICATION DEVICE FOR CONTROLLING THE USE OF CONTENT

(75) Inventors: Satoshi Washio, Sapporo (JP); Hiroshi Kawabata, Sapporo (JP); Tomoo Yamaguchi, Kawasaki (JP)

(73) Assignee: NTT DoCoMo, Inc., Tokyo (JP)

(*) Notice: Subject to any disclaimer, the term of this patent is extended or adjusted under 35 U.S.C. 154(b) by 243 days.

(21) Appl. No.: 10/583,622

(22) PCT Filed: Dec. 15, 2004

(86) PCT No.: PCT/JP2004/019152

§ 371 (c)(1),
(2), (4) Date: Apr. 23, 2007

(87) PCT Pub. No.: WO2005/059759

PCT Pub. Date: Jun. 30, 2005

(65) Prior Publication Data

US 2007/0197201 A1    Aug. 23, 2007

(30) Foreign Application Priority Data

Dec. 17, 2003   (JP)   ............................. 2003-420188

(51) Int. Cl.
*H04M 1/00*   (2006.01)
(52) U.S. Cl. .................... 455/558; 455/550.1; 455/411; 455/418; 455/425; 455/410; 379/211.05; 379/357.01; 379/433.09
(58) Field of Classification Search ................. 455/407, 455/410–411, 418, 412, 466, 435.1, 433, 455/550.1, 551, 556–558, 566, 564, 186.1; 713/182, 193; 726/4, 27; 379/211.05, 357.01, 379/357.02, 433.09
See application file for complete search history.

(56) References Cited

U.S. PATENT DOCUMENTS 5,282,247 A    1/1994   McLean et al. ................ 380/4

(Continued)

FOREIGN PATENT DOCUMENTS

EP    0 607 767 B1    11/1997

(Continued)

OTHER PUBLICATIONS

Tsutao Nishizaki, "Card v. Mobile Phone: Next-Generation Mobile Phone and SIM," CardWave, pp. 30-33, Mar. 2001.

(Continued)

*Primary Examiner*—Kamran Afshar
*Assistant Examiner*—Babar Sarwar
(74) *Attorney, Agent, or Firm*—Brinks Hofer Gilson & Lione

(57) ABSTRACT

In a communication terminal using UIM, when a message disabling use of a content is received not by a communication terminal containing the content to disabled, but by another communication terminal containing the same content, the content stored in a storage unit of the communication terminal which has received the message is not disabled. Mobile phone 100-1 using UIM stores a program in correlation with a telephone number stored in the UIM. When mobile phone 100-1 receives a management message to delete a program, mobile phone 100-1 interprets the content of the management message. Mobile phone 100-1 obtains a telephone number from the UIM, and deletes the content stored in correlation with the telephone number according to the management message interpreted.

18 Claims, 8 Drawing Sheets

U.S. PATENT DOCUMENTS

| | | | | |
|---|---|---|---|---|
| 5,933,773 | A | 8/1999 | Barvesten | 455/411 |
| 6,047,071 | A | 4/2000 | Shah | 380/273 |
| 6,091,946 | A | 7/2000 | Ahvenainen | 455/411 |
| 6,141,563 | A * | 10/2000 | Miller et al. | 455/558 |
| 6,173,172 | B1 | 1/2001 | Masuda et al. | 455/410 |
| 6,212,372 | B1 | 4/2001 | Julin | 455/418 |
| 6,236,859 | B1 | 5/2001 | Morper | 455/435 |
| 6,314,409 | B2 | 11/2001 | Schneck et al. | 705/54 |
| 6,320,947 | B1 | 11/2001 | Joyce et al. | 379/144 |
| 6,342,010 | B1 | 1/2002 | Slifer | 463/39 |
| 6,381,316 | B2 | 4/2002 | Joyce et al. | 379/114.2 |
| 6,445,914 | B1 | 9/2002 | Findikli et al. | 455/411 |
| 6,501,962 | B1 | 12/2002 | Green | 455/558 |
| 6,633,764 | B1 | 10/2003 | Garcia | 455/466 |
| 6,810,479 | B1 | 10/2004 | Barlow et al. | 713/185 |
| 6,836,654 | B2 * | 12/2004 | Decotignie | 455/410 |
| 6,850,777 | B1 * | 2/2005 | Estes et al. | 455/558 |
| 6,871,063 | B1 | 3/2005 | Schiffer | 455/410 |
| 6,975,855 | B1 | 12/2005 | Wallenius | 455/417 |
| 6,999,948 | B1 | 2/2006 | Hatanaka et al. | 705/65 |
| 7,130,648 | B1 | 10/2006 | Fournier et al. | 455/466 |
| 7,248,886 | B1 | 7/2007 | Ljungstroem et al. | 455/465 |
| 7,349,697 | B2 | 3/2008 | Onaka et al. | 455/435.1 |
| 7,450,929 | B2 * | 11/2008 | Washio et al. | 455/410 |
| 7,650,630 | B2 | 1/2010 | Yamada | 726/4 |
| 2002/0099665 | A1 | 7/2002 | Burger et al. | 705/67 |
| 2003/0135748 | A1 * | 7/2003 | Yamada et al. | 713/193 |
| 2004/0073580 | A1 | 4/2004 | Nakayama et al. | |
| 2004/0133794 | A1 | 7/2004 | Kocher et al. | 713/193 |
| 2004/0248550 | A1 * | 12/2004 | Hausner et al. | 455/410 |
| 2007/0197201 | A1 * | 8/2007 | Washio et al. | 455/418 |
| 2008/0300020 | A1 * | 12/2008 | Nishizawa et al. | 455/558 |
| 2009/0029736 | A1 * | 1/2009 | Kim et al. | 455/558 |
| 2010/0071037 | A1 | 3/2010 | Yamada et al. | 726/4 |

FOREIGN PATENT DOCUMENTS

| | | | |
|---|---|---|---|
| EP | 1 047 277 A2 | | 10/2000 |
| EP | 1 085 395 A2 | | 3/2001 |
| EP | 1 107 627 A1 | | 6/2001 |
| EP | 1 143 688 A1 | | 10/2001 |
| GB | 2369205 A | * | 5/2002 |
| JP | H08-065740 | | 3/1996 |
| JP | H09-023268 | | 1/1997 |
| JP | H09-322239 | | 12/1997 |
| JP | H11-191804 | | 7/1999 |
| JP | H11-306118 | | 11/1999 |
| JP | 2000-049687 | | 2/2000 |
| JP | 2000-099187 | | 4/2000 |
| JP | 2002-100116 A | | 4/2002 |
| JP | 2002-135407 A | | 5/2002 |
| JP | 2003-198718 | | 7/2003 |
| JP | 2005-086253 | | 3/2005 |
| KR | 2001-0043378 | | 5/2001 |
| WO | WO 97/44762 A1 | | 11/1997 |
| WO | WO 99/57843 A1 | | 11/1999 |
| WO | WO 00/48416 A1 | | 8/2000 |
| WO | WO 00/59225 A1 | | 10/2000 |
| WO | WO 03/040930 | | 5/2003 |

OTHER PUBLICATIONS

Office Action mailed May 26, 2006, in U.S. Patent Publication No. 2003/0135748 A1, U.S. Appl. No. 10/314,520.
Office Action mailed Feb. 27, 2007, in U.S. Patent Publication No. 2003/0135748 A1, U.S. Appl. No. 10/314,520.
Office Action mailed Nov. 16, 2007, Patent Publication No. 2003/0135748 A1, U.S. Appl. No. 10/314,520.
Office Action mailed May 28, 2008, Patent Publication No. 2003/0135748 A1, U.S. Appl. No. 10/314,520.
Office Action mailed Feb. 2, 2009, Patent Publication No. 2003/0135748 A1, U.S. Appl. No. 10/314,520.
Notice of Allowance mailed Apr. 30, 2009, Patent Publication No. 2003/0135748 A1, U.S. Appl. No. 10/314,520.
Microsoft Outlook 98, http://support.microsoft.com/?kbid=181005, 2 pages of English version, 3 pages of Japanese version, Jul. 30, 2001.
Japanese Office Action dated Sep. 11, 2007, issued in Japanese Patent Application No. 2001-392068, with English translation, 5 pages.
Republic of the Philippines Intellectual Property Office Official Gazette, vol. VII, No. 5, Aug. 18, 2004, regarding Philippines Patent Application No. 1-2002-00861, 3 pages.
Office Action dated Dec. 13, 2004, issued in Singapore Patent Application No. 200207356-7, 9 pages.
Office Action dated Mar. 24, 2005, issued in Korean Patent Application No. 10-2002-0083605, 3 pages.
Office Action dated Apr. 15, 2005, issued in Canadian Patent Application No. 2,413,231, 3 pages.
European Search Report dated Jun. 9, 2005, issued in European Patent Application No. 02028128, 3 pages.
Office Action dated Jan. 14, 2008, issued in Norwegian Patent Application No. 20026210, with English translation, 6 pages.
U.S. Appl. No. 12/626,585, filed Nov. 25, 2009, Yamada.
Notice of Allowance dated Aug. 21, 2009, issued in U.S. Appl. No. 10/314,520 (9 pages).
Issue Notification dated Dec. 30, 2009, issued in U.S. Appl. No. 10/314,520 (1 page).

* cited by examiner

FIG. 2

INPUT USER INFORMATION

NOW, YOUR INFORMATION WILL BE REGISTERED.

PLEASE INPUT YOUR PHONE NUMBER IN THE TEXTBOX BELOW.
THEN CLICK "NEXT" BUTTON.

PHONE NUMBER

[ BX1 ]

[ NEXT ]　[ CANCEL ]

— P10

* * * * * * * * * * * * *
DOWNLOAD PROGRAM
* * * * * * * * * * * * *

PLEASE CLICK "DOWNLOAD" BUTTON TO START DOWNLOADING.

[ NEXT ]　[ CANCEL ]

— P11

| PHONE NUMBER | MANAGEMENT DATA |
|---|---|
| 0*0-XXXX-YYYY | ENABLED |
| 0*0-AAAA-BBBB | DELETE |

TB1

| FILE NAME | MANAGEMENT DATA |
|---|---|
| abc | ENABLED |
| def | DELETE |

TB2

| 0*0-XXXX-YYYY | 0*0-AAAA-BBBB |
|---|---|
| abc | zzz |
| def | yyy |

TB3

| PHONE NUMBER | FILE NAME | MANAGEMENT DATA |
|---|---|---|
| | abc | ENABLED |
| 0*0-XXXX-YYYY | def | DELETE |
| | aaa | ENABLED |

COMMUNICATION DEVICE FOR CONTROLLING THE USE OF CONTENT

BACKGROUND OF THE INVENTION

1. Technical Field

The present invention relates to managing a content stored in a communication terminal.

2. Description of the Related Arts

Mobile phones in conformity with the IMT-2000 (International Mobile Telecommunication 2000) standard are configured in a way that an IC card, that is referred to as UIM (User Identity Module), is attachable to and removable from the mobile phone. UIM is issued to a subscriber to a communication carrier operating a mobile communication network. The UIM stores subscriber information of a subscriber, for example, a phone number assigned to the subscriber by the communication carrier. When the owner of UIM attaches the UIM to a mobile phone, the mobile phone is enabled to communicate using the subscriber information stored in the UIM. Mobile phones conforming to the IMT-2000 standard are also capable of performing data communications. Some of them are also capable of communicating with a WWW (World Wide Web) server apparatus connected to the Internet, obtaining various data and/or various application programs, or the like (in the following, the data and programs will be referred to simply as "content"), and storing the obtained content in a storage unit such as a non-volatile memory, and making use of the obtained content.

A content to be distributed is sometimes updated by a distributor of the content. In some cases, when a content to be distributed is updated at a WWW server apparatus, content that has already been distributed to a mobile phone needs to be updated accordingly. A known technique of updating a content that has been distributed to a mobile phone is that the server apparatus distributing a content stores telephone numbers of mobile phones to which the content has been distributed, and sends a message updating the content to the mobile phones by using the telephone numbers stored in the mobile phones (for example, see Japanese Patent Publication JP11-A-25017).

Application of the technology disclosed in JP11-A-25017 makes it possible to instruct a mobile phone to control a storage unit to delete a content stored in the mobile phone or to disable use of a content by transmitting a message from a WWW server apparatus. However, an instruction to delete the content stored in a mobile phone using UIM or to disable a use of the content by transmitting such a message from a WWW server apparatus may cause problems as shown below.

For example, use of content distributed from a WWW server apparatus may be allowed as a condition of payment of monthly fees to an operator of the WWW server apparatus. The operator of a WWW server apparatus that provides such a service needs to make the content stored in the mobile phone unusable, when a person who has downloaded the content to his/her mobile phone stops paying the fee for use of the content. Consequently, the WWW server apparatus obtains a telephone number of the corresponding mobile phone, and tries to delete the content in the mobile phone by transmitting a message to the mobile phone having the corresponding telephone number.

Now, it is assumed that a user of a mobile phone obtains a content from a WWW server apparatus by using his/her own mobile phone (for this example, referred to as mobile phone A), and stores the content in mobile phone A. Then, he/she borrows another mobile phone (for this example, referred to as mobile phone B) that stores the same content, and attaches his/her UIM to mobile phone B. In this case, a message transmitted from the WWW server apparatus is transmitted to the borrowed mobile phone B attached with the UIM. The content that has been downloaded to mobile phone B by its owner is deleted. The content that is essentially to be deleted and is stored in mobile phone A, to that the content has been downloaded, is not deleted. Consequently, the result is against intent of the operator of the WWW server apparatus. Furthermore, it puts an owner of mobile phone B at a disadvantage.

The present invention is accomplished in view of the above circumstances, and has an object of providing a communication terminal using UIM, a program, and storage medium. In the communication terminal using UIM, when a message disabling use of a content is received not by a communication terminal containing the content to be disabled, but by another communication terminal containing the same content, the content stored in a storage unit of the communication terminal which has received the message is not disabled.

SUMMARY OF THE INVENTION

To accomplish its object, the present invention provides a communication terminal having: attachment means for attaching a module, the module storing a user identification for use in a communication network; storage means that stores a content in correlation with the user identification; receiving means that receives a message to disable a use of the content stored in the storage means; interpreting means that interprets the message received by the receiving means; determining means that obtains a user identification from the module, and determines whether the user identification obtained is stored in the storage means in correlation with the content that is specified to be disabled by the message interpreted by the interpreting means; and first control means that controls the storage means according to the content of the message interpreted by the interpreting means to disable a use of the content that is specified to be disabled by the message interpreted by the interpreting means, only when the determining means has determined that the content that is specified to be disabled by the message interpreted by the interpreting means is stored in the storage means in correlation with the user identification obtained from the module.

According to the present invention, when a communication terminal receives a message to disable a use of a content, the communication terminal interprets the received message. The communication terminal obtains a user identification from a module storing a user identification for use in a communication network, and determines whether the user identification obtained is stored in the storage means in correlation with the content that is specified to be disabled by the message interpreted by the interpreting means. The communication terminal disables a use of the content that is specified to be disabled by the message interpreted by the interpreting means according to the content of the message interpreted by the interpreting means, only when it has been determined by the determining means that the content that is specified to be disabled by the message interpreted by the interpreting means is stored in the storage means in correlation with the user identification obtained from the module.

According to the present invention, in a communication terminal using a module storing a user identification for use in a communication network, when a message to disable use of a content is received not by a communication terminal containing the content specified to be disabled, but by another communication terminal containing the same content, the content stored in a storage unit of the communication terminal which has received the message is not disabled.

BRIEF DESCRIPTION OF THE DRAWINGS

FIG. 2 illustrates a page provided by server apparatus 500 according to the same embodiment.

DESCRIPTION OF THE PREFERRED EMBODIMENTS

In the following description, embodiments of the present invention will be described with reference to drawings.

1. Configuration

1-1. General configuration

Figure 1:
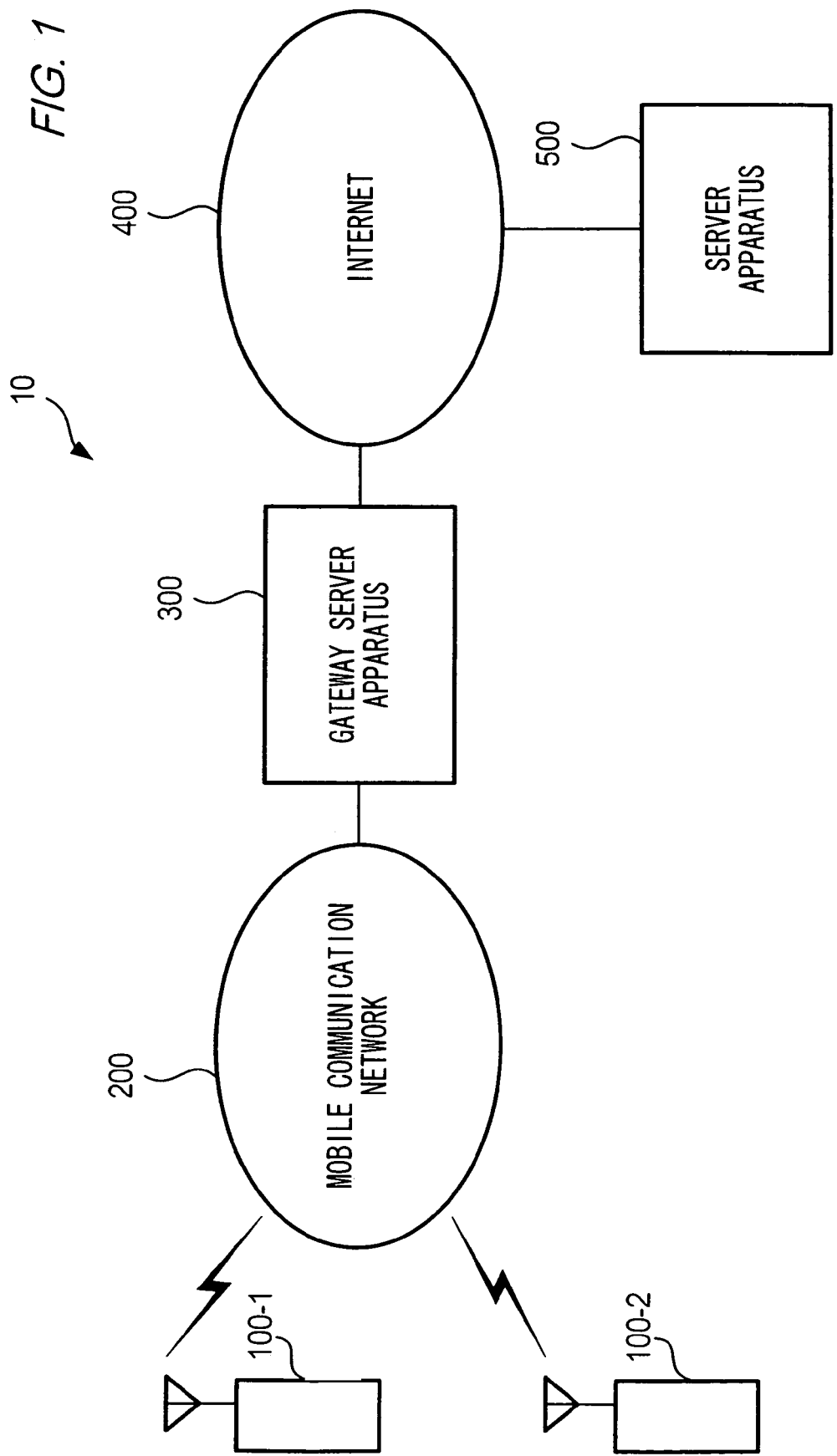
FIG. 1 illustrates a whole configuration of a communication system according to an embodiment of the present invention.

FIG. 1 illustrates a general configuration of a communication system according to an embodiment of the present invention. Although there exist a plurality of mobile phones and a plurality of server apparatuses in communication system 10, only mobile phone 100-1, mobile phone 100-2, and server apparatus 500 are depicted in FIG. 1, to keep the drawing simple, (Since mobile phone 100-1 and mobile phone 100-2 have the same configuration, these mobile phones will be abbreviated as mobile phone 100 below, in particular when no distinction is required to be made).

Mobile communication network 200 is, for example, a communication network conforming to the IMT-2000 standard. Mobile communication network 200 provides telecommunication service and/or data communication service to a user who has a contract with a communication carrier that operates mobile communication network 200. Mobile communication network 200 includes wireless base stations performing wireless communications with mobile phones, switches (not shown) connected to the wireless base stations, gate switches (not shown) connected to the switches and gateway server apparatus 300.

Gateway server apparatus 300 connects mobile communication network 200 and Internet 400, to each other. Gateway server apparatus 300 changes protocols used in mobile communication network 200 to TCP/IP (Transmission Control Protocol/Internet Protocol), the standard protocol in Internet 400, and vice versa, when packet communications between Internet 400 and mobile communication network 200 are performed.

Mobile phone 100 is a mobile phone conforming to IMT-2000 standard. Mobile phone 100 is able to perform packet communications, and to communicate with server apparatus 500 connected to Internet 400 via mobile communication network 200, gateway server apparatus 300, and Internet 400. Mobile phone 100 is owned by a user who has a contract with the communication carrier operating mobile communication network 200.

Server apparatus 500 has similar functions to those of a general WWW server apparatus, and is connected to Internet 400. Domain name "aaa.cojp" is assigned to server apparatus 500.

1-2. Configuration of Server Apparatus

Next, the configuration of server apparatus 500 will be described. Server apparatus 500 stores server software for causing server apparatus 500 to function as a general WWW server apparatus. When server apparatus 500 executes the server software, server apparatus 500 is granted a function of a general WWW server apparatus, and is able to perform a communication, for example, in accordance with HTTP (HyperText Transfer Protocol).

Server apparatus 500 stores two text files written in HTML (HyperText Markup Language). In the following, such text files will be referred to as HTML files. One is an HTML file which produces page P10 illustrated in FIG. 2 when interpreted by a WWW browser. In the following, this will be referred to as an AAA file. The filename of the AAA file is "aaa.html". The URL indicating a storage location of the AAA file is "http://www.abc.cojp/aaa.html". The other is an HTML file which produces page P11 illustrated in FIG. 2 when interpreted by a WWW browser. In the following, this will be referred to as a BBB file. The file name of the BBB file is "bbb.html". The URL indicating a storage location of the BBB file is "http://www.abc.cojp/bbb.html". Furthermore, server apparatus 500 stores an application program to be distributed to mobile phone 100. The filename of the application program is "abc". The URL of the application program is "http://www.abc.co jp/abc". Furthermore, server apparatus 500 stores client table TB1 and a CGI program. The filename of the CGI program is "input.cgi". The URL of the program is "http://www.abc.cojp/input.cgi".

Page P10 file is written so that CPU 108 generates an HTTP request message using a POST method including the telephone number input in text box BX1 shown in FIG. 2 and the URL of the CGI program "input.cgi" as parameters (In the following, this will be abbreviated as an HTTP request.), when a user clicks "NEXT" button in page P10. Furthermore, BBB file is written so that CPU 108 generates an HTTP request, using a GET method, of obtaining the application program "abc" when a user clicks "DOWNLOAD" button shown in FIG. 2.

Figures 3, 4:
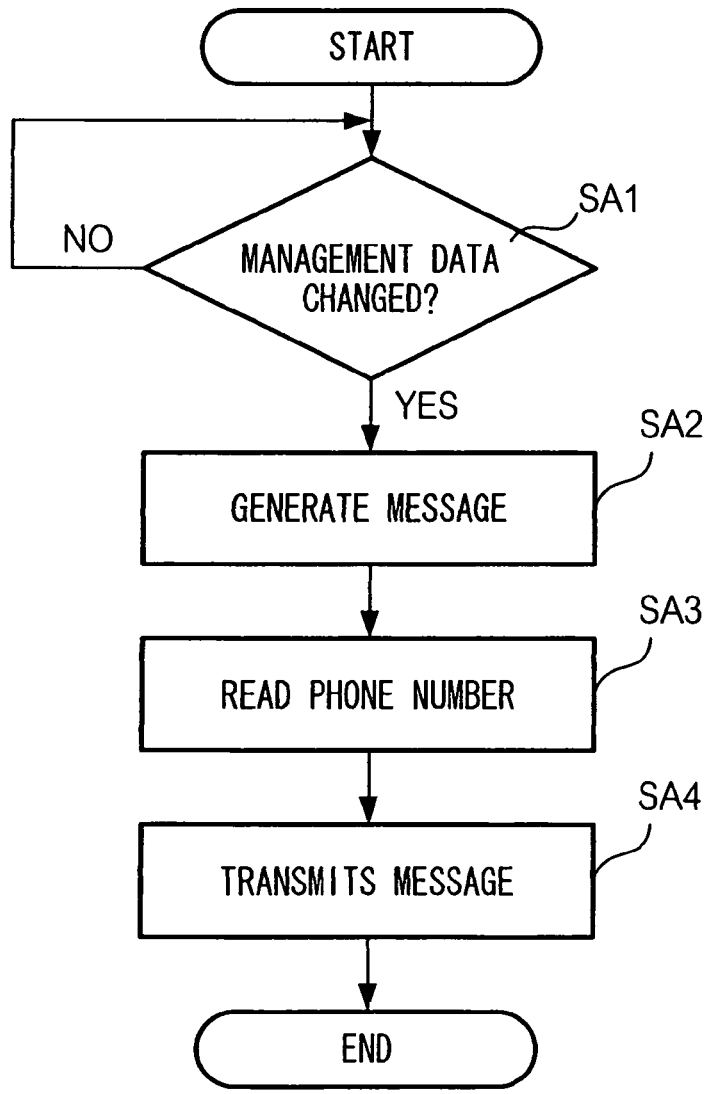
FIG. 3 illustrates a format of client table TB1 stored in server apparatus 500 according to the same embodiment.
FIG. 4 is a flowchart illustrating an operational flow of server apparatus 500 according to the same embodiment, when server apparatus 500 transmits a management message.

FIG. 3 illustrates a format of client table TB1. As illustrated in FIG. 3, telephone numbers of the target, to which contents were distributed in the past, are stored in client table TB1 in correlation with data indicating the status of management of application programs at the target (in the following, this will be referred to as management data).

When server apparatus 500 running the server software receives an HTTP request using a POST method and including the URL of the CGI program "input.cgi" as a parameter, server apparatus 500 executes the CGI program specified with the URL. Server apparatus 500 executes the CGI program "input.cgi", and stores the telephone number included in the HTTP request in client table TB1 in correlation with management data. Next, server apparatus 500 generates an HTTP response message including the BBB file (In the following this will be referred to as an HTTP response), and transmits the response to the mobile phone 100, that has transmitted the HTTP request.

When the server software is executed on server apparatus 500, server apparatus 500 is granted a function of transmitting a message to delete an application program distributed by server apparatus 500 to mobile phone 100. FIG. 4 is a flowchart illustrating an operational flow of server apparatus 500 when server apparatus 500 transmits the management message to mobile phone 100.

When an administrator of server apparatus 500 operates to change the management data in client table TB1 using a keyboard (not shown), a management message is generated that includes the filename "abc" of the application program that server apparatus 500 distributes, together with management data. When the management message is generated, a telephone number corresponding to the changed management data is read, and the management message is transmitted to mobile phone 100 attached with the UIM 109 storing the telephone number. As previously described, server apparatus 500 is configured in a similar manner to a general computer apparatus.

1-3. Configuration of a Mobile Phone

Figures 5, 6:
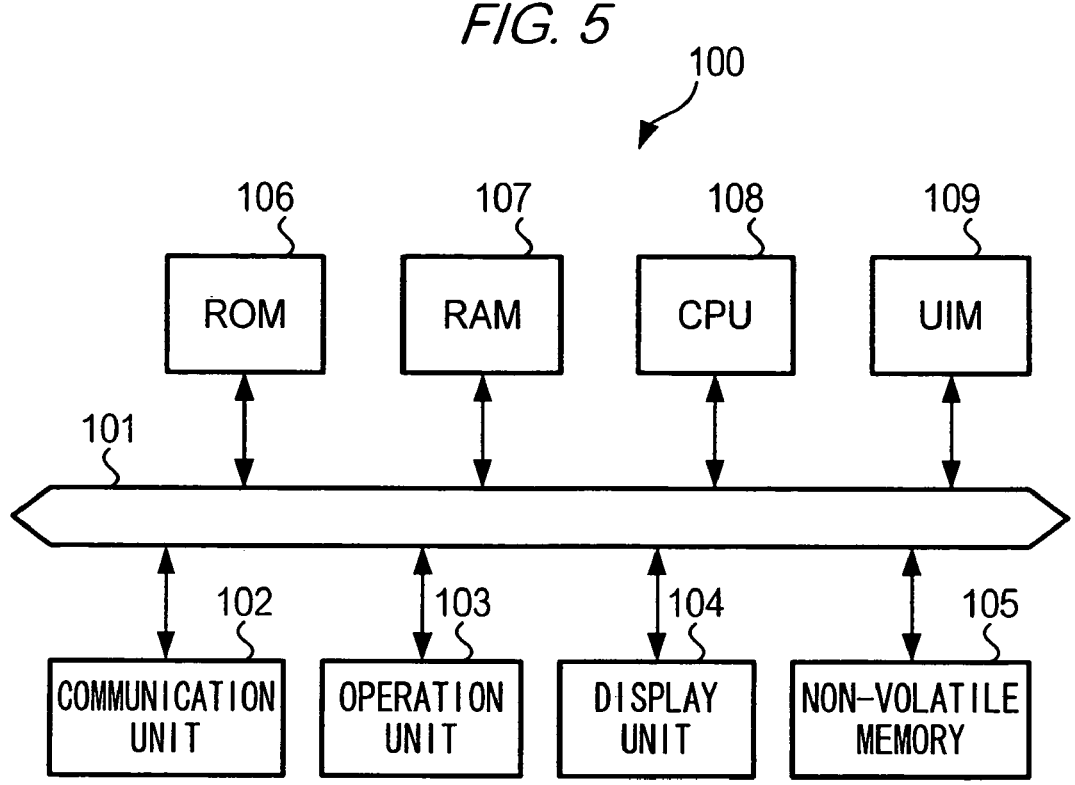
FIG. 5 illustrates a hardware configuration of mobile phone 100 according to the same embodiment.
FIG. 6 illustrates a format of program list table TB2 stored in UIM 109 attached to mobile phone 100 according to the same embodiment.

Next, configuration of mobile phone 100 will be described. FIG. 5 is a block diagram illustrating a hardware configuration of mobile phone 100. As shown in FIG. 5, each component of mobile phone 100 is connected to bus 101, and data are transferred between the components via bus 101.

Communication unit 102 functions as a communication interface, and performs, under the control of CPU (Central Processing Unit) 108, wireless communications to and from a wireless base station, that constitutes mobile communication network 200, via an antenna (not shown). Communication unit 102 transmits signals output by CPU 108 to the wireless base station, and outputs signals transmitted from the wireless base station to CPU 108. Operation unit 103 has a plurality of keys such as ten keys (not shown). When a user of mobile phone 100 presses down a key of operation unit 103, operation unit 103 outputs a signal indicating the pressed key to CPU 108. Display unit 104 has, for example, an LCD display (not shown) and a control unit that control the display of the LCD display, and displays, under the control of CPU 108, characters, graphic screens, menu screens for operating mobile phone 100, and/or the like on the LCD display.

UIM 109 is configured similarly to a general computer apparatus, and includes a CPU, a ROM (Read Only Memory), a RAM (Random Access Memory), a communication interface for communicating with CPU 108, and a non-volatile memory. These components are not shown in the Figure. The non-volatile memory of UIM 109 stores the telephone number "0*0-XXXX-YYYY" assigned to a subscriber by the communication carrier operating mobile communication network 200. The non-volatile memory of UIM 109 also stores program list table TB2. FIG. 6 illustrates a format of program list table TB2. As shown in FIG. 6, program list table TB2 stores a filename of the application program that was downloaded from server apparatus 500 when UIM 109 was attached to mobile phone 100 in correlation with management data of the application program. ROM of UIM 109 stores OS (Operating System) software for controlling each component of UIM 109. When UIM 109 is attached to mobile phone 100 and power is supplied to UIM 109 from mobile phone 100, CPU of UIM 109 loads OS software from the ROM and executes the OS software. When the OS software is executed UIM 109 communicates with CPU 108 via the communication interface and bus 101, and controls the non-volatile memory of UIM 109 corresponding to instructions from CPU 108.

Figures 7, 8:
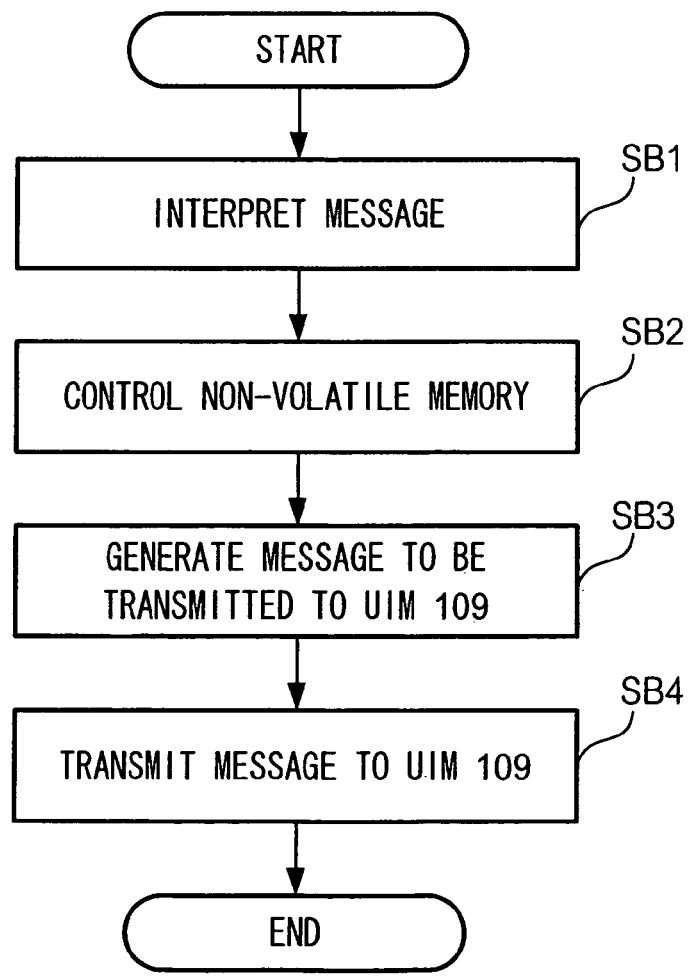
FIG. 7 illustrates a format of program management table TB3 stored in non-volatile memory 105 of mobile phone 100 according to the same embodiment.
FIG. 8 is a flowchart illustrating an operational flow of CPU 108 of mobile phone 100 according to the same embodiment, when CPU 108 receives a management message.

Non-volatile memory 105 stores data used for controlling mobile phone 100 or application programs downloaded from server apparatus 500. Non-volatile memory 105 also stores program management table TB3. FIG. 7 illustrates a format of program management table TB3. As shown in FIG. 7, the filename of the application program downloaded from server apparatus 500 is stored in program management table TB3 in correlation with the telephone number stored in UIM 109 attached to mobile phone 100 when the application program was downloaded.

ROM 106 stores, for example, OS software for controlling each component of mobile phone 100, a browser program for executing a WWW browser that is able to interpret HTML syntax, and the like. Furthermore, ROM 106 stores a program for establishing on CPU 108 access control, that is, application of interpreting management messages transmitted from server apparatus 500, and controlling non-volatile memory 105 and UIM 109 (in the following this will be referred as a control program). Details of access control will be described later.

When power is supplied from a power source (not shown), CPU 108 sets in RAM 107 a working area, and loads the OS software from ROM 106, and executes the OS software. While running the OS software, CPU 108 processes according to signals input to CPU 108. For example, when a user of mobile phone 100 presses down keys of operation unit 103, CPU 108 determines instructions input by the user according to the signals output from operation unit 103 and the screen displayed on display unit 104. Then, CPU 108 processes according to the instructions input by the user.

Figure 9:
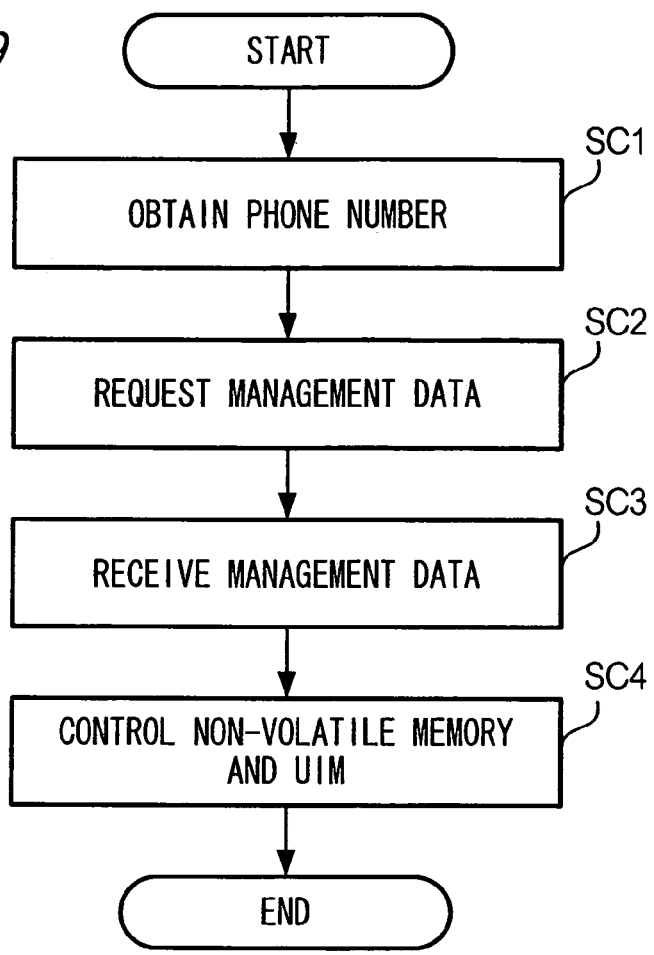
FIG. 9 is a flowchart illustrating an operational flow performed by mobile phone 100 according to the same embodiment, when access control is established.

After CPU 108 executes the OS software, CPU 108 reads and executes the control program from ROM 106. When the control program is executed at CPU 108, access control is established. FIGS. 8 and 9 are flowcharts illustrating a flow performed by CPU 108, by which access control is established.

When CPU 108 receives a management message from server apparatus 500, the management message is processed by the established access control. FIG. 8 is a flowchart illustrating a flow when CPU 108, by which an access control is established, processes a management message. CPU 108 interprets the management message, and controls UIM 109 and non-volatile memory 105 according to the management message, to delete an application program stored in non-volatile memory 105, to delete data stored in program management table TB3, or to add, change, or delete data stored in program list table TB2 contained in UIM 109.

FIG. 9 is a flowchart illustrating an operational flow when access control is established. When access control is established, CPU 108 obtains a telephone number from UIM 109. When CPU 108 obtains the telephone number, CPU 108 reads a filename of the application program stored in program management table TB3 in correlation with the telephone number obtained, and attempts to obtain management data corresponding to the filename by transmitting a message to UIM 109 requesting the management data. When CPU 108 obtains the management data, CPU 108 controls non-volatile memory 105 and UIM 109 according to the management data obtained. For example, if the management data is "DELETE", CPU 108 deletes the filename specified when the management data is read from program management table TB3, and deletes the application program specified with the filename from non-volatile memory 105. When CPU 108 finishes controlling non-volatile memory 105, CPU 108 generates a message to delete the filename specified when the management data is read and the management data stored in correlation with the filename, and transmits it to UIM 109. When UIM 109 receives the message, UIM 109 deletes the filename and management data that are specified to be deleted from program list table TB2.

When a user of mobile phone 100 presses down keys of operation unit 103 to use a WWW browser, a browser program is executed to establish a WWW browser. When the WWW browser is used to download an application program from a server apparatus connected to Internet 400, a filename of the downloaded program is stored in program management table TB3 in correlation with the telephone number stored in the attached UIM 109. Furthermore, the telephone number stored in UIM 109 attached is stored in non-volatile memory 105 in correlation with the downloaded application program. When the filename of the program is stored in program management table TB3, the program generates a message including the filename of the downloaded program and the management data "ENABLED", and of requesting to store the filename included in correlation with the included management data, and transmits it to UIM 109. When UIM 109 receives the message, UIM 109 stores the filename in correlation with the management data in program list table TB2. As described, mobile phone 100 is configured in a similar manner to a general computer apparatus.

2. Working Examples

Next, the first working example to the third working example of the present embodiment will be described.

2-1. First Working Example

Figure 10:
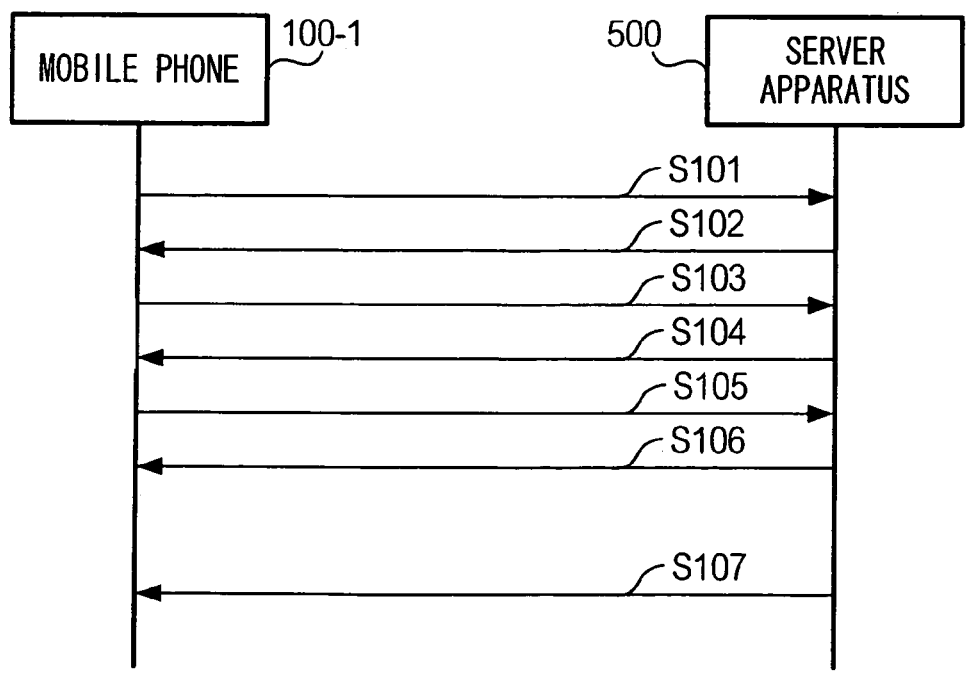
FIG. 10 illustrates a first working example of the same embodiment.

First, the first working example of the present embodiment will be described with reference to FIG. 10. In the first working example, a working example will be first described in which a user of mobile phone 100 downloads a program stored in server apparatus 500 using mobile phone 100-1. Then, a working example will be described in which a management message is transmitted from server apparatus 500 to mobile phone 100-1 storing the program.

When the user of mobile phone 100-1 turns on the mobile phone 100-1, after OS software is executed, a control program is executed to establish access control. Next, the user of mobile phone 100-1 operates to execute a WWW browser using keys of operation unit 103 of mobile phone 100-1, and WWW browser is executed. When the user of mobile phone 100-1 inputs a URL of AAA file using keys of operation unit 103 to obtain the AAA file, an HTTP request using a GET method and including the URL of the AAA file as a parameter is transmitted to server apparatus 500 (FIG. 10: Step S101).

When server apparatus 500 receives the HTTP request, server apparatus 500 generates an HTTP response including the AAA file, and transmits it to mobile phone 100-1 (Step S102).

When CPU 108 of mobile phone 100-1 receives the HTTP response, the AAA file included in the response is interpreted by the WWW browser as page P10 illustrated in FIG. 2 is displayed in display unit 104. When a user viewing page P10, inputs in text box BX1 a telephone number "0*0-XXXX-YYYY" assigned to an owner of the UIM 109 using keys of operation unit 103, and clicks "NEXT" button, CPU 108 generates an HTTP request including the URL (http://www.abc.cojp/input.cgi) described in the AAA file and the telephone number input in the text box BX1 as parameters of a POST method, and transmits the request to server apparatus 500 (Step S103).

When server apparatus 500 receives the HTTP request, server apparatus 500 executes a CGI program specified with the URL included as a parameter, and stores the telephone number included also as a parameter in client table TB1. Next, server apparatus 500 generates an HTTP response including a BBB file, and transmits the response to mobile phone 100-1 (Step S104).

When CPU 108 receives the HTTP response, page P11 illustrated in FIG. 2 is displayed. When a user viewing page P11 clicks "Download" button using keys of operation unit 103, CPU 108 generates an HTTP request including a URL (http://www.abc.cojp/abc) described in the BBB file as a parameter of a GET method, and transmits the request to server apparatus 500 (Step S105). Server apparatus 500 that has received the HTTP request generates an HTTP response including the program "abc" specified in the URL included as a parameter, and transmits the response to mobile phone 100-1 (Step S106).

When CPU 108 of mobile phone 100-1 receives the HTTP response, the "abc" included in the response is extracted by the WWW browser, and the extracted program is stored in non-volatile memory 105 in correlation with the telephone number stored in UIM 109. When CPU 108 stores the downloaded program in non-volatile memory 105, CPU 108 stores the filename "abc" of the stored program in program management table TB3 in correlation with the telephone number "0*0-XXXX-YYYY" stored in UIM 109. Next, CPU 108 stores the filename of the downloaded application program, and generates a message requesting change of the management data to "ENABLED", and transmits it to UIM 109. Next, CPU 108 transmits a message including the filename of the downloaded program and the management data "ENABLED", and requesting storing the filename in correlation with the management data to UIM 109. When CPU of UIM 109 receives the message, CPU stores the filename and the management data included in the message in program list table TB2 stored in non-volatile memory of UIM 109.

As described above, when mobile phone 100-1 downloads an application program from server apparatus 500, a telephone number assigned to a person who has downloaded the application program is stored in server apparatus 500. Furthermore, the downloaded application program, the filename of the downloaded application program, and the telephone number stored in UIM 109 while the application program is downloaded are stored in mobile phone 100-1. Furthermore, the filename of the application program in UIM 109 is attached to mobile phone 100-1 while the application program is downloaded.

When an owner of UIM 109 does not pay a fee for use of the downloaded application program, the administrator of server apparatus 500 tries to delete the application program that has been downloaded and stored. When the administrator of server apparatus 500 sets the management data corresponding to the telephone number "0*0-XXXX-YYYY" in client table TB1 to "DELETE" by using the keyboard of server apparatus 500, so as to delete the program stored in mobile phone 100-1, a management message including the filename "abc" of the application program distributed by server apparatus 500 and the management data "DELETE" is generated (FIG. 4: Step SA1). When the management message is generated, the telephone number "0*0-XXXX-YYYY" corresponding to the changed management data is read (Step SA2). CPU 108 transmits the generated management message by addressing the mobile phone to which UIM 109 that stores the telephone number is attached (FIG. 4: Step SA3, FIG. 10: Step S107).

When mobile phone 100-1, to which UIM 109 is attached, receives the management message, the message is interpreted by the established access control. CPU 108, by which the access control is established, interprets that the content of the management message transmitted from server apparatus 500, instructs deletion of the application program with the filename "abc" (FIG. 8: Step SB1).

Next, CPU 108 seeks the telephone number "0*0-XXXX-YYYY", that is stored in UIM 109, in program management table TB3 stored in non-volatile memory 105. When CPU 108 finds the corresponding telephone number, CPU 108 seeks the filename "abc" included in the management message from filenames stored in correlation with the telephone number. By the above-mentioned downloading operation of an application program, the filename "abc" is stored in program management table TB3 as shown in FIG. 7. Thus, CPU 108 deletes the filename "abc" from program management table TB3. Next, CPU 108 deletes the application program having the filename "abc" from non-volatile memory 105, wherein the filename is stored in correlation with the telephone number stored in UIM 109 (Step SB2).

Next, CPU 108 generates a message to delete the filename "abc" included in the management message and the management data stored in correlation with the management message (Step SB3), and transmits it to UIM 109 (Step SB4). When UIM 109 receives the message, UIM 109 deletes the filename "abc" stored in program list table TB2 and the management data stored in correlation with the filename.

As described above, mobile phone 100 interprets abstract messages transmitted from server apparatus by using an access control established on mobile phone 100, and deletes the program stored in non-volatile memory 105 and the data stored in UIM 109.

2-2. Second Working Example

Figure 11:
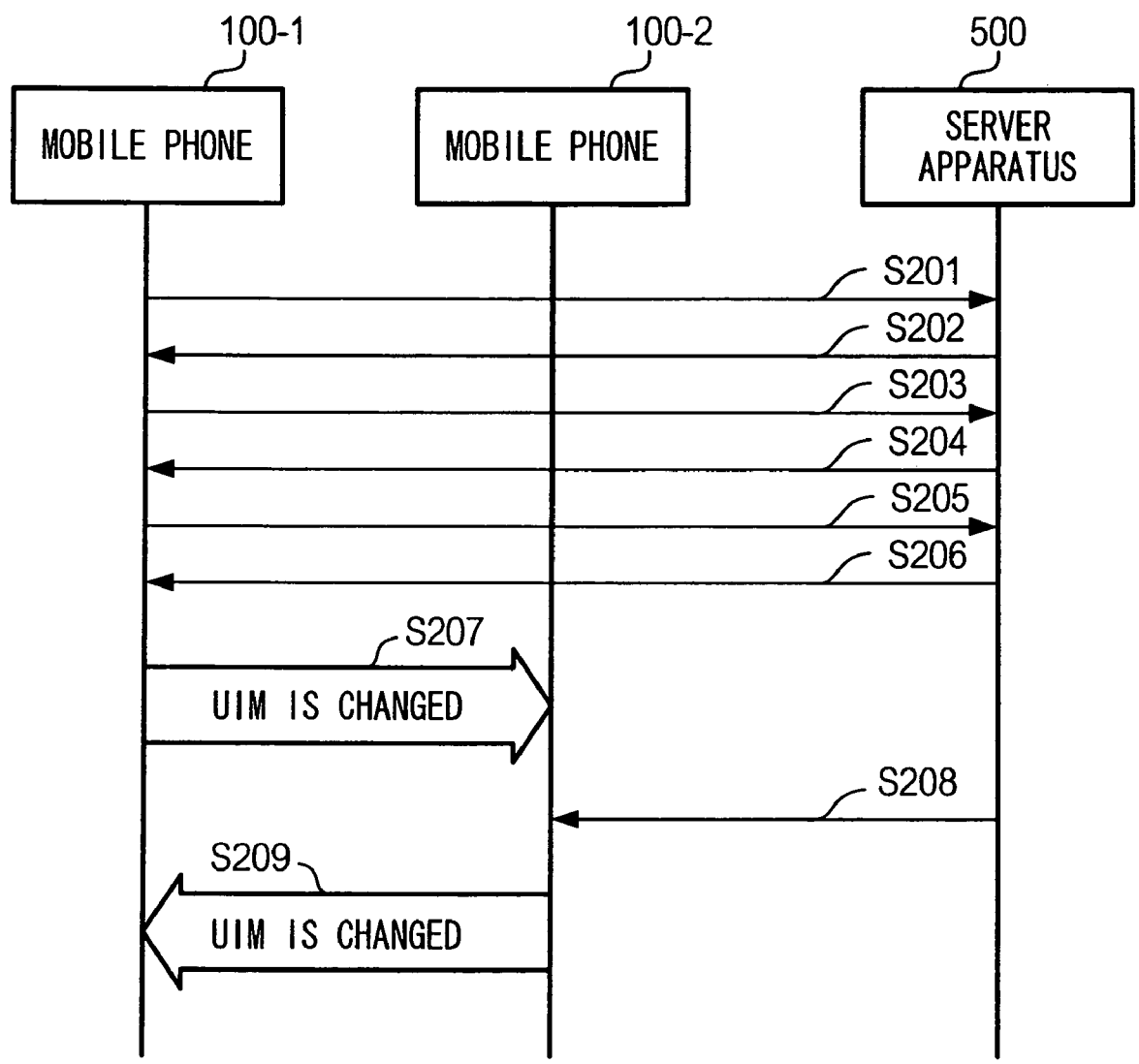
FIG. 11 illustrates a second working example of the same embodiment.

Next, the second working example of the present embodiment will be described with reference to FIG. 11. In the second working example, UIM is moved from mobile phone 100-1 that has downloaded an application program from server apparatus 500, to mobile phone 100-2 that does not store the application program distributed by server apparatus 500; a management message is transmitted from server apparatus 500; and then, UIM 109 is moved again to be attached to mobile phone 100-1. Here, since the operation of mobile phone 100-1 of downloading an application program (FIG. 11: Steps S201-S206) is the same as that of the first working example, its description will be omitted.

After UIM 109 is moved from mobile phone 100-1 that has downloaded the application program to be attached to mobile phone 100-2 (Step S207), when the administrator of server apparatus 500 changes the management data corresponding to the telephone number "0*0-XXXX-YYYY" in client table TB1 to "DELETE" by using a keyboard of server apparatus 500, so as to delete the program stored in mobile phone 100-1, a message including the filename "abc" of the application program distributed by server apparatus 500 and the management data "DELETE" (FIG. 4: Step SA1). When the management message is generated, the telephone number "0*0-XXXX-YYYY" corresponding to the changed management data is read (Step SA2). CPU 108 transmits the generated management message by addressing the mobile phone attached with UIM 109 that stores the telephone number (FIG. 4: Step SA3, FIG. 11: Step S208).

When mobile phone 100-2 attached with UIM 109 receives the management message, the message is interpreted by the means of the established access control. When access control has been established, CPU 108 interprets that the content of the management message transmitted from server apparatus 500 is a deletion of the application program having the filename "abc" (FIG. 8: Step SB1).

First, CPU 108 searches a telephone number "0*0-XXXX-YYYY" in program management table TB3 stored in non-volatile memory 105 the telephone number "0*0-XXXX-YYYY" stored in UIM 109. When CPU 108 finds the corresponding telephone number, CPU 108 seeks the filename "abc" included in the management message from the filenames stored in correlation with the telephone number. As mentioned above, the filename "abc" and the application program having the filename "abc" are not stored in non-volatile memory 105 of mobile phone 100-2. Accordingly, no application programs are deleted (Step SB2).

Next, CPU 108 generates a message to change the management data corresponding to the filename "abc" included in the management message to "DELETE" (Step SB3), and transmits it to UIM 109 (Step SB4). When the CPU of UIM 109 receives the message, the CPU changes the management data corresponding to the filename "abc" to "DELETE".

Next, the user attaches UIM 109 to mobile phone 100-1 (Step S209), and powers on the mobile phone, and access control is established after the OS software is executed. When access control is established on CPU 108 mobile phone 100-1, CPU 108 obtains a telephone number "0*0-XXXX-YYYY" from UIM 109 (FIG. 9: Step SC1). Next, CPU 108 reads the filename "abc" of the application program stored in correlation with the telephone number obtained from program management table TB3, and transmits a message to request the management data corresponding to the obtained filename to UIM 109 (Step SC2). When UIM 109 receives the message, UIM 109 reads the management data "DELETE" stored in correlation with the filename "abc", and transmits it to CPU 108.

When CPU 108 receives the management data (Step SC3), CPU 108 deletes the filename "abc" of the program stored in correlation with the telephone number obtained from program management table TB3, and deletes the application program stored in correlation with the telephone number "0*0-XXXX-YYYY" and having the filename "abc" from non-volatile memory 105 of mobile phone 100-1. Next, CPU 108 generates a message to delete the management data stored in correlation with the deleted filename "abc", and transmits it to UIM 109. When UIM 109 receives the message, UIM 109 deletes the filename "abc" stored in program list table TB2 and the management data stored in correlation with the filename (Step SC4).

As described above, when a message to delete a program is transmitted from server apparatus 500 to mobile phone 100, in which the program is not stored in non-volatile memory 105, mobile phone 100 changes the management data stored in UIM 109 to "DELETE". Then, when UIM 109 is attached to mobile phone 100 in which the program specified in the message is stored, the program stored in non-volatile memory 105 is deleted according to the management data stored in UIM 109.

2-3. Third Working Example

Figures 12, 13:
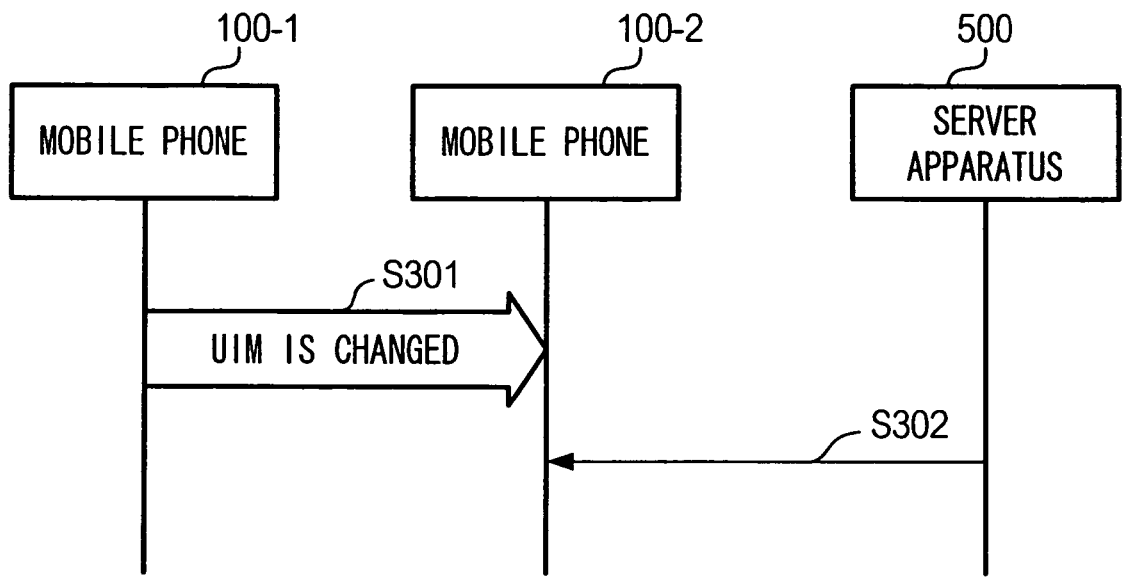
FIG. 12 illustrates a third working example of the same embodiment.
FIG. 13 illustrates a format of client table used in a modification of the same embodiment.

Next, the third working example of the present embodiment will be described with reference to FIG. 12. In the third working example, mobile phone 100-1 attached with UIM 109 downloads an application program from server apparatus 500; the UIM 109 is moved to be attached to mobile phone 100-2 that stores the application program in correlation with a telephone number "0*0-AAAA-BBBB"; and then, a management message is transmitted from server apparatus 500. Here, since the operations of mobile phone 100-1 and mobile phone 100-2 of downloading an application program are the same as those of the first working example, their description will be omitted. Furthermore, since server apparatus 500 operates in a similar manner to that of the first working example, their description will be omitted.

After UIM 109 is attached to mobile phone 100-2 (Step S301), when a management message including the filename "abc" of the application program and the management data "DELETE" is received by mobile phone 100-2 (Step S302), the message is interpreted by means of the access control established on CPU 108. When CPU 108 interprets that the content of the management message is an instruction to delete the application program having the filename "abc" (FIG. 8: Step SB1), CPU 108 seeks the telephone number "0*0-XXXX-YYYY" stored in UIM 109 in program management table TB3 stored in non-volatile memory 105.

When CPU 108 finds a corresponding telephone number, CPU 108 seeks the management data corresponding to the filename "abc" included in the management message from the filenames stored in correlation with the telephone number. In non-volatile memory 105 of mobile phone 100-2, application program with the filename "abc" is stored. However, the filename "abc" is stored in program management table TB3 in correlation with the telephone number "0*0-AAAA-BBBB", but the filename "abc" is not stored in correlation with the telephone number "0*0-XXXX-YYYY" that is stored in UIM 109. Accordingly, CPU 108 does not delete the application program (Step SB2). Next, CPU 108 generates a message to change the management message corresponding to the filename "abc" included in the management message to "DELETE" (Step SB3), and transmits it to UIM 109 (Step SB4). When the CPU of UIM 109 receives the message, the CPU changes the management data corresponding to the filename "abc" to "DELETE".

As described above, even in the case that mobile phone 100 stores an application program having the same filename as the filename included in the management message, the application program stored in non-volatile memory 105 is not deleted when mobile phone 100 does not store the application program specified with the filename included in the message. Even when the management message is transmitted in the case that the user of mobile phone 100-1 borrows and uses another user's mobile phone 100-2 that stores the same application program, the application program stored in the other user's mobile phone 100-2 is not deleted.

3. Modifications

The present invention is not limited to the above embodiment. In the following, modifications to the embodiment will be described.

The management messages transmitted from server apparatus 500 may include not only a message to delete an application program, but also a message to disable use of an application program. Server apparatus 500 is configured to transmit a management message including the management data to mobile phone 100, when the administrator of server apparatus 500 changes the management data to "DISABLED". When the management message is received by mobile phone 100, the management data in program list table TB2 stored in UIM 109 is changed to "DISABLED". When the OS established on CPU 108 receives an instruction to execute an application program, the OS checks program list table TB2 in UIM 109. When the management data corresponding to the application program for which execution is instructed is "DISABLED", the OS is configured not to read and not to execute the application program from non-volatile memory 105. According to this aspect, use of an application program may be disabled not only by deletion of an application program, but also by keeping the application program stored in non-volatile memory 105.

What is distributed from server apparatus 500 is not limited to application programs. It may include image data for displaying an image and/or music data for generating music sound.

In the above-mentioned embodiment, UIM 109 has a configuration similar to a general computer apparatus. UIM 109 may be simply configured to have a storage unit only. When UIM 109 has simply a storage unit only, CPU 108 may control the storage unit of the UIM directly.

In the above-mentioned embodiment, server apparatus 500 transmits both an application program and a management message. However, a server apparatus for transmitting a management message and a server apparatus for distributing an application program may be configured separately.

Server apparatus 500 may distribute a plurality of application programs. When server apparatus 500 distributes a plurality of application programs, it will be configured that client table TB1 is modified as illustrated in FIG. 13, and a telephone number and the filename of the distributed program are stored and managed in correlation with the management data.

The application program may be a program written using Java™ byte code (In the following, it will be abbreviated as a Java program). It is noted that a Java executing platform is required to download a Java program from a server apparatus or to execute the Java program. When a Java program is downloaded to mobile phone 100, the Java program is configured to be managed by the Java executing platform, so that other application programs are not able to, for example, delete the Java program from non-volatile memory 105. In this aspect, when a Java program is deleted according to a management message, access control may be configured to interpret the management message, to generate a message, interpretable by the Java executing platform, of requesting a deletion of a Java program, and to pass the message to the Java executing platform. The Java executing platform that has received the message may be configured to delete the Java program. Even if there exist a plurality of software platforms such as a software platform established on the mobile phone 100 or a software platform established on UIM, the access control interprets a management message transmitted from server apparatus 500, and exercises appropriate control according to each software platform. Thus, server apparatus 500 does not need to transmit a management message by addressing each software platform, and the application program that has been distributed to mobile phone 100 may be managed with only an abstract message.

Various software stored in ROM 106 of mobile phone 100 may be configured as rewritable. As examples of rewriting various software, the following methods are included. For example, a rewritable flash ROM is used in place of ROM 106. A storage medium storing various software, such as a CD-ROM, (Compact Disc Read Only Memory) is loaded in a CD-ROM drive of a personal computer, the personal computer and mobile phone 100 are connected with a cable. The personal computer reads the various software stored in the CD-ROM, and transmits the read software to mobile phone 100 connected with the cable. Then, the software stored in mobile phone 100 is upgraded when mobile phone 100 that receives the software writes the received software in the flash ROM. Using such a method, software stored in mobile phone 100 is rewritable for a purpose of upgrading or the like. Furthermore, various software may be rewritten by downloading it via Internet 400.

In the above-mentioned embodiment, the WWW browser stores data in program management table TB3 and transmits a message to UIM 109, when an application program is downloaded. However, an OS or access control may be used to monitor a download of an application program, and the OS or the access control may be used to store data in program management table TB3.

In the above-mentioned embodiment, mobile phone 100 downloads and stores an application program from server apparatus 500. However, the application program may be pre-installed in mobile phone 100 when mobile phone 100 is manufactured, and client table TB1, program list table TB2, and program management table TB3 may be generated before pre-packing of mobile phone 100.

In the above-mentioned embodiment, a telephone number stored in UIM 109 is used as information identifying mobile phone 100 transmitting a management message. However, the information is not limited thus. The information of identifying mobile phone 100 that transmits a management message may be other information, such as an email address, so long as the information is able to identify UIM 109 and mobile communication network 200 is able to transmit a message to mobile phone 100 according to the information.

In the above-mentioned embodiment, when a user of mobile phone 100 inputs the telephone number stored in UIM 109 in text box BX1 in page P10, the telephone number is stored in client table TB1. However, the way that server apparatus 500 stores a telephone number in client table TB1 is not limited thus. It may be configured such that the WWW browser established on mobile phone 100 describes the telephone number, that is stored in UIM 109, in the header of an HTTP request, and server apparatus 500 stores the telephone number described in the header of the HTTP request in client table TB1.

In the above-mentioned embodiment, the filename of an application program and the management data are stored in UIM 109, when the application program is downloaded. However, it may be configured so that only the filename is stored when downloaded, and that CPU 108 determines that an application program is in an enabled state when the management data is not stored in correlation with the filename.

A device that downloads an application program from server apparatus 500, and a device to which a management message is transmitted is not limited to a mobile phone. It may be a communication terminal able to utilize a mobile communication network, such as a PDA (Personal Digital Assistant), a hand-held personal computer, or the like.

In the above-mentioned embodiment, application program and program management table TB3 are stored in non-volatile memory 105. However, these may be stored in a storage medium attachable to and removable from mobile phone 100.

The management message transmitted by server apparatus 500 is not limited to an aspect of including a filename and management data as illustrated in the above-mentioned embodiment. The management message may be an instruction to delete an application program, and to assign the application program that will be deleted. For example, the management message may instruct deletion of an application when only the filename of an application program is included in the management message, and disabling a use of an application program when other data is included in addition to the filename.

What is claimed is:

1. A communication terminal, comprising:
    a module interface configured to receive a module, wherein the module includes a module user identification used in a communication network for identifying a user of the module;
    a memory configured to store a data set including a content and the module user identification associated with the content, wherein the stored module user identification is indicative of the module coupled to the module interface at a time the content is stored in the memory;
    a receiver configured to receive a message to disable a specified content;
    a processor in communication with the module interface, the memory and the receiver, the processor configured to retrieve the module user identification from the module that is connected to the module interface, and in response to receipt of the message, the processor is further configured to determine whether the data set includes the specified content, and in response to determination that the data set includes the specified content, the processor is further configured to determine whether the stored module user identification stored in the data set matches the retreived module user identification; and
    in response to the determination that the stored module user identification matches the retrieved module user identification, the processor is further configured to disable use of the specified content included in the data set stored in the memory.

2. The communication terminal of claim 1, wherein to disable use of the specified content, the processor is further configured to erase the specified content from the memory.

3. The communication terminal of claim 1, further comprising:
    the processor configured to retrieve management data stored on the module, and the processor further configured to manage access to the specified content based upon the management data retrieved from the module; and
    wherein to disable use of the specified content included in the data set stored in the memory, the processor is further configured to modify the management data stored on the module to disable use of the specified content by the communication terminal.

4. The communication terminal of claim 3, wherein the processor is further configured to control the module based upon a type of the module.

5. The communication terminal of claim 3, wherein the processor is further configured to control access to the specified content based upon a permission indication contained within the management data.

6. The communication terminal of claim 3, wherein in response to receipt of the message to disable the specified content, the processor is further configured to delete the specified content based upon the information contained in the management data.

7. A communication terminal comprising:
    a memory including computer program code executable on a processor, the computer program code including:
    an instruction to store a data set including a content and a module user identification in the memory, wherein the stored module user identification is indicative of a module coupled to the communication terminal at a time the content is stored;
an instruction to parse a message received through a communication network to disable the content stored in the memory of the communication terminal;
an instruction to retrieve the module user identification from the module coupled to the communication terminal, wherein the retrieved module user identification identifies a user of the module to the communication terminal;
an instruction to determine whether the stored module user identification contained in the data set matches the retrieved module user identification retrieved from the module; and
an instruction to disable use of the content stored in the data set in response to the determination that the stored module user identification contained in the data set matches the retrieved module user identification retrieved from the module.

8. The communication terminal of claim 7, wherein the instruction to disable use of the content included in the data set further comprises:
an instruction to erase the data set that includes the content specified in the message to be disabled from the memory.

9. The communication terminal of claim 8, further comprising:
an instruction to retrieve management data stored on the module;
an instruction to manage access to the content included in the data set based upon the management data retrieved from the module; and
an instruction to modify the management data stored on the module to disable use of the content by the communication terminal in further response to the determination that the stored module user identification contained in the data set matches the retrieved module user identification retrieved from the module.

10. The communication terminal of claim 9, wherein the instruction to modify the management data stored on the module to disable use of the content by the communication terminal comprises:
an instruction to control the module based upon a type of the module.

11. The communication terminal of claim 9, further comprising:
an instruction to govern access to the content based upon the management data.

12. The communication terminal of claim 9, further comprising:
an instruction to delete, in response to receipt of the message to disable the content, the content based upon the information contained in the management data.

13. The communication terminal of claim 7, further comprising:
an instruction to deny access by the communication terminal to the content in response to the determination that the stored module user identification contained in the data set mismatches the retrieved module user identification retrieved from the module.

14. A method for controlling access to a specific content stored on a communication device based upon an identification of the communication device within a mobile communication network, the method comprising:
storing a data set including a content and a module user identification associated with the content in a memory of a communication terminal, wherein the stored module user identification is indicative of a module coupled to the communication terminal at a time the content was obtained;
retrieving a module user identification from the module coupled to the communication terminal;
receiving, with the communication terminal, a message to control the content;
in response to receipt of the message to control the content, determining, with the communication terminal, whether the stored module user identification matches the retrieved module user identification; and
in response to the determination that the stored module user identification matches the retrieved module user identification, erasing the data set that includes the content from the memory of the communication terminal.

15. A method for controlling access to a specific content stored on a communication device based upon an identification of the communication device within a mobile communication network, the method comprising:
storing a data set including a content and a module user identification in a memory of a communication terminal, wherein the stored module user identification is indicative of a module coupled to the communication terminal at a time the content was obtained;
retrieving the module user identification from the module coupled to the communication terminal;
connecting the communication terminal identified with the retrieved module user identification to a communication network;
receiving, with the communication terminal, a message to control the content included in the data set;
in response to receipt of the message to control the content included in the data set, determining, with the communication terminal, whether the stored module user identification matches the retrieved module user identification; and
in response to the determination that the stored module user identification matches the retrieved module user identification, modifying a content management table stored on the module to disable use of the content with any communication terminal operated in conjunction with the module.

16. The method of claim 15, further comprising:
controlling the module based upon a module type of the module.

17. The method of claim 15, further comprising:
governing access to the content based upon the content management table stored in the module.

18. The method of claim 15, further comprising:
based upon the content management table stored in the module, deleting the content.

* * * * *

UNITED STATES PATENT AND TRADEMARK OFFICE
CERTIFICATE OF CORRECTION

PATENT NO. : 7,848,780 B2
APPLICATION NO. : 10/583622
DATED : December 7, 2010
INVENTOR(S) : Satoshi Washio et al.

It is certified that error appears in the above-identified patent and that said Letters Patent is hereby corrected as shown below:

In the Claims

In Column 14, line 61, delete "the" after --upon--.

In Column 15, line 53, delete "the" after --upon--.

Signed and Sealed this
Fifteenth Day of March, 2011

David J. Kappos
*Director of the United States Patent and Trademark Office*